Sept. 10, 1940.  G. L. HASSLER  2,214,370
PORTABLE DRILLING MECHANISM
Filed Oct. 31, 1938  2 Sheets-Sheet 1
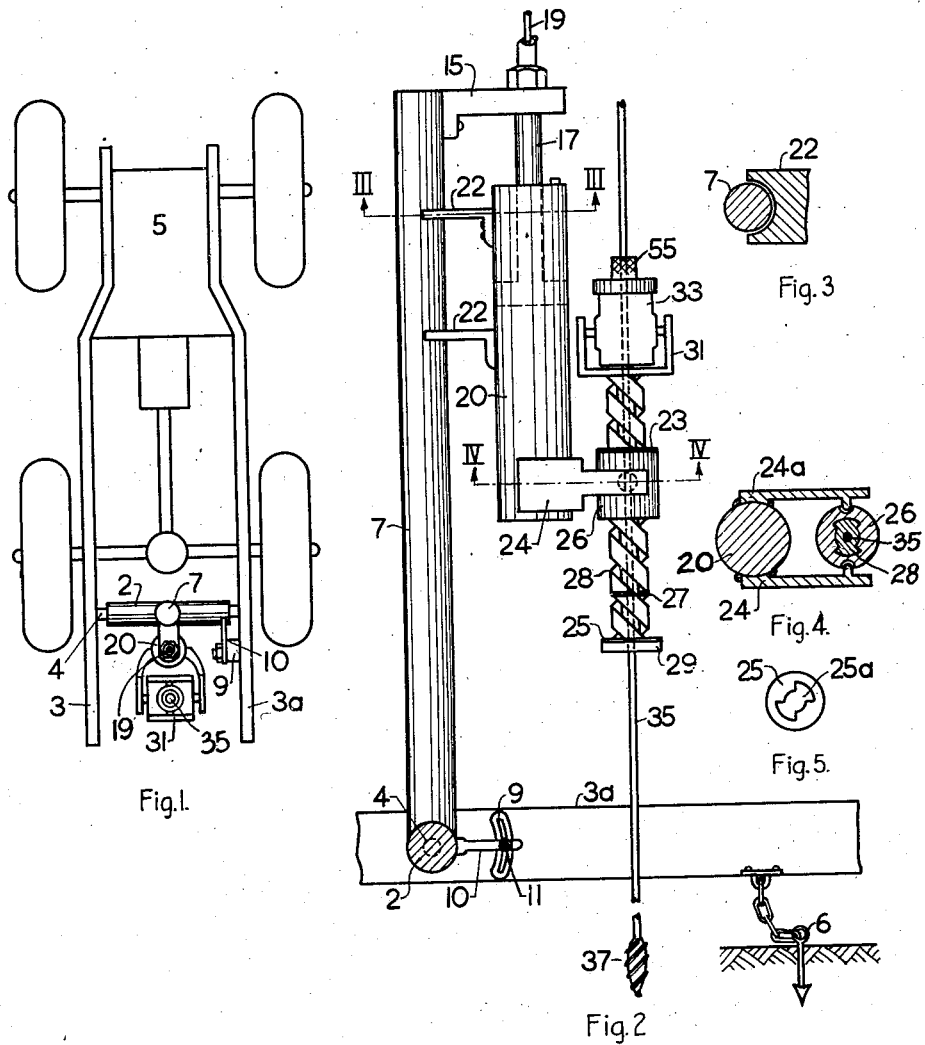
Inventor: Gerald L. Hassler
By his Attorney:

Sept. 10, 1940.   G. L. HASSLER   2,214,370
PORTABLE DRILLING MECHANISM
Filed Oct. 31, 1938   2 Sheets-Sheet 2

Inventor: Gerald L. Hassler
By his Attorney

Patented Sept. 10, 1940

2,214,370

UNITED STATES PATENT OFFICE 2,214,370

PORTABLE DRILLING MECHANISM

Gerald L. Hassler, Berkeley, Calif., assignor to Shell Development Company, San Francisco, Calif., a corporation of Delaware Application October 31, 1938, Serial No. 237,915

1 Claim. (Cl. 255—19)

The present invention pertains to the art of drilling or boring holes in the ground, or of driving thereinto rods, augers, or other similar tools, and has for its object to provide a drilling or driving mechanism capable of being mounted on a vehicle and of being quickly moved therewith from station to station for purposes such as, for example, soil exploration, said mechanism being capable of operation under any conditions of flat or sloping terrain.

It is also an object of this invention to provide a drilling or driving mechanism comprising a hydraulic ram and a reversible clutch whereby the weight of the vehicle on which the mechanism is mounted is effectively applied either to force the desired tool into the ground, or to withdraw it therefrom.

It is also an object of this invention to provide a mechanism comprising a lead screw device capable of either a rotative drilling, or of a linear driving action.

The present invention will be understood from the following description taken with reference to the attached drawings, wherein:

Fig. 1 is a schematic plan view showing a vehicle, such as an automobile or truck with the present drilling or driving mechanism mounted thereon;

Fig. 2 is an elevation view, partly in cross-section, of said drilling or driving mechanism;

Figs. 3 and 4 are plan views taken in cross-section along lines III—III and IV—IV of Fig. 2, respectively;

Fig. 5 is a plan view of the plate 25 shown in Fig. 2;

Figure 7:
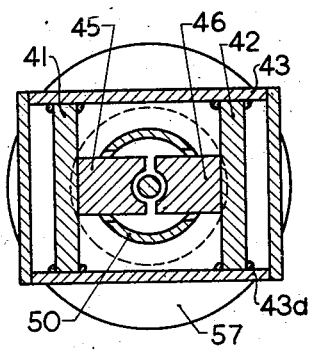
Fig. 7 is a plan view in cross-section taken along line VII—VII of Fig. 6.

Referring to Figs. 1 and 2, a transverse heavy steel member 2 is rotatably mounted on pivots 4 between the longitudinal frame members 3 and 3a of a vehicle 5. Suitably attached, for example, by welding, to the cross-member 2, is a steel post 7, located approximately midway between the frame members 3 and 3a, and normally at right angles thereto. A member 10, welded or bolted to the member 2 is an adjustable sliding engagement, by means of a screw 11 with a slotted member 9, welded or bolted to the frame member 3a. When operating on a sloping ground, for example, on the side of a steep hill, the screw 11 is loosened, and the post 7 rotated about the pivots 4 until it assumes a vertical or other desired position, whereafter the screw 11 is tightened again and drilling may be carried along a vertical line.

A cross-arm 15 is welded or bolted to the post 7, and supports, by means of a hollow piston-rod 17, a hydraulic cylinder 20.

A pressure liquid from a pump, or other suitable device (not shown on the drawings), is delivered to cylinder 20 by means of pipe or pipes 19 and causes it to reciprocate in a vertical direction, the supports 22 (shown also in Fig. 3) guiding said cylinder along a path parallel to the post 7. The construction of the hydraulic cylinder is of conventional nature and forms no part of the present invention.

Pivoted between arms 24 and 24a, welded to the casing of the cylinder 20, is a threaded nut 26 travelling along a lead screw 28. Fixedly attached to one end of the lead screw 28 is a plate 29, and to the other end a yoke 31, in which is pivoted a clutch or grip mechanism 33 shown in detail in Figs. 6 and 7.

The clutch 33, lead screw 28, and plate 29 are provided with an internal bore through which passes a rod or drill stem 35, which may be provided with a head or drill bit 37, adapted to be forced into the ground.

Figure 6:
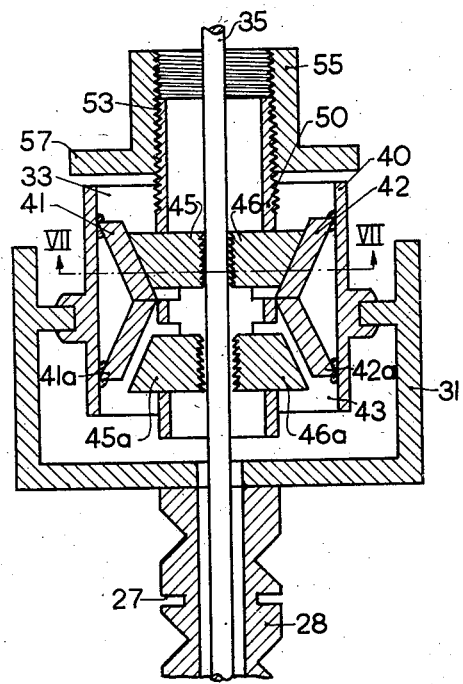
Fig. 6 is a vertical cross-section view of clutch 33 of Fig. 2.

Referring to Figs. 6 and 7, the yoke 31 is shown supporting a clutch box 33, open at the top and bottom. Guiding plates 41, 41a, 42, and 42a are welded, at an angle to each other and to the vertical, to the walls 43 and 43a of the clutch box. These plates guide into engagement with rod 35, passing within the clutch box 33, the grips 45, 45a, 46, and 46a, the rod 35 being held for upward motion by suitably cut teeth of grips 45 and 46, and for downward motion by those of grips 45a and 46a.

Figure 8:
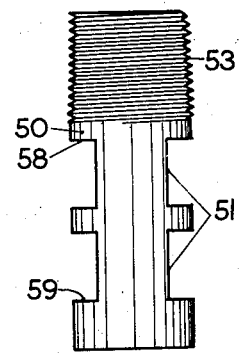
Fig. 8 is an elevation view of the slotted supporting pipe 50 of Fig. 6.

For proper engagement of the grips 45, 45a, 46, and 46a with the rod 35, the grips are loosely supported by a tubular holder 50, shown also in Fig. 8, which is provided for this purpose with four slots such as shown at 51. The tubular holder or slotted pipe 50, which surrounds the rod 35, is capable of relative vertical motion with regard to the clutch box 33 and rod 35, and is provided with an upper threaded portion 53, adapted to engage a screw-threaded cap or lid 55.

When it is desired to operate the clutch for pulling the rod 35 from the ground, the cap 55 is unscrewed until the rim 57 of cap 55 is out of engagement with the walls of the clutch box 33.

Mechanical or manual downward pressure is then applied to cap 55 and slotted pipe 50, which is transmitted through shoulders 58 of the upper slots 51 to the upper face of grips 45 and 46, causing them to slide down along the guiding plates 41 and 42 into wedging engagement with rod 35, while the lower grips 45a and 46a remain idle in their slots, in the position shown in Fig. 6. When it is desired to operate the clutch for forcing the rod 35 into the ground, the cap 55 is screwed down along holder 50 until the rims 57 engage the walls of the box 40, whereupon continued rotation of cap 55 causes the grip holder 50 to move upwards, relieving the pressure on the grips 45 and 46, and causing grips 45a and 46a to engage the rod 35 through the pressure exerted by the shoulders 59 of the lower slots 51 on the lower face of said grips.

In operation, the vehicle 5 is taken to the location wherein it is desired to drill a hole, or to drive a rod into the ground. By adjusting the mechanism 9—10—11, the post 7 is given a desired generally vertical position while the clutch mechanism 33 is set so as to bring the lower grips 45a and 46a into engagement with the rod 35, as explained above. A pressure liquid is then delivered to the cylinder 20, causing it to move downwards. The motion of cylinder 20 causes nut 26 to move downwards along the lead screw 28 causing the latter to rotate together with the clutch mechanism 33 and to move downward under a pressure not exceeding the weight of the whole assembly including the vehicle but sufficient to drive bit 37 of rod 35 into the ground, said rod being firmly held by the lower grips 45a and 46a. After the cylinder 20 reaches the end of its downward stroke, the wedging pressure of plates 41a and 42a on the grips 45a and 46a, is relieved by the reversal of motion of cylinder 20, and grips 45a and 46a are caused to slide upwards along the rod 35 during the upward stroke of the cylinder without lifting said rod.

When it is desired to pull from the ground a rod which had been drilled or driven thereinto, the present mechanism is operated in the same manner, but with the upper grips 45 and 46, instead of the lower grips 45a and 46a in operative engagement with the rod 35, thus reversing the unidirectional movement of rod 35.

Figure 9:
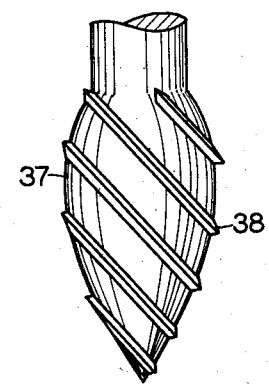
Fig. 9 is a detailed view of the bit used with the present apparatus.

The drill head 37, another, left-hand threaded embodiment of which is shown in Fig. 9, is preferably given a conical shape, and is provided with machined or welded-on screw-threads 38, having a pitch angle of from 30° to 50°, whereby a cutting action is secured in rocky, cemented soils. The head 37 may be hard-faced with a material such as tungsten carbide. The rotation of the head 37 results in the application of a vertical component of force to the drive point by the ground at the place where the head enters the ground. This action results in the conversion, at the point of penetration, of the torque applied to the head into a large vertical force additional to the vertical force which is applied to the drill rod and head through clutch 33 and which is limited by the stiffness of rod 35.

When operating in relatively soft ground, where a quick penetration is possible, it may be desirable simply to drive the rod 35 into the ground, without having recourse to the rotational drilling action of the present mechanism. In such cases the following procedure may be followed: One or more narrow horizontal slots 27 are cut in the threads of the lead screw 28, as shown in Figs. 2 and 6. One or more locking plates 23 and 25, provided with openings 25a for sliding along the threads of the screw 28 and for engaging said slots, may normally rest freely on top of the nut 26 or of plate 29. When these plates are shifted along the threads of screw 28 to bring them in register with slots 27, and are given a 90° turn to engage said slots 27, the nut 26 is firmly held against or between plates 23 or 25, which prevents any rotational or linear motion of the lead screw 20 with regard to nut 26. The reciprocating motion of the cylinder 20 results therefore in a rectilinear ramming action of the rod 35, which is gripped as before by the clutch 33 for downward or upward motion. This procedure is usually also followed when pulling the rod from the ground.

It will be seen that the motion of the cylinder 20 results in effectively applying the weight of the vehicle 5 to the rod 35 in forcing said rod into the ground. In cases where it is desired to apply for these purposes to the rod 35 a weight greater than that of the vehicle 5, the latter may be anchored to the ground by forcing thereinto a spike or anchoring rod 6 attached, for example, to a frame member of the vehicle 5.

I claim as my invention:

In a portable device for forcing tools into the ground and for removing them therefrom, a supporting frame, actuating means mounted on the frame for reciprocating vertical motion, a rod adapted to be forced into the ground, a clutch comprising a set of grips to engage said rod for vertical upward motion and a set of grips adapted to engage said rod for vertical downward motion, means for moving one of said sets of grips into operative engagement with the rod; and means comprising a nut attached to the actuating means and a lead screw attached to the clutch for converting the reciprocating motion of the actuating means into a rotational motion of said rod.

GERALD L. HASSLER.